(12) United States Patent
Kargilis et al.

(10) Patent No.: US 8,827,349 B2
(45) Date of Patent: Sep. 9, 2014

(54) FLIP-OVER WINDOW ASSEMBLY FOR VEHICLE

(71) Applicants: John S Kargilis, Northville, MI (US); Michael A Thomson, Livonia, MI (US)

(72) Inventors: John S Kargilis, Northville, MI (US); Michael A Thomson, Livonia, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/645,736

(22) Filed: Oct. 5, 2012

(65) Prior Publication Data

US 2014/0097637 A1    Apr. 10, 2014

(51) Int. Cl.
*B60J 1/18*    (2006.01)
*B60J 5/10*    (2006.01)

(52) U.S. Cl.
USPC .................. 296/146.16; 296/100.02

(58) Field of Classification Search
USPC ............. 296/146.16, 136.01, 136.04, 100.01, 296/100.02, 146.15, 100.06
See application file for complete search history.

(56) References Cited

U.S. PATENT DOCUMENTS

| | | | |
|---|---|---|---|
| 2,815,977 A | 12/1955 | Podolan | |
| 3,676,954 A | 7/1972 | Rapport et al. | |
| 4,184,709 A * | 1/1980 | Kim | 296/219 |
| 4,519,645 A | 5/1985 | Kelly et al. | |
| 4,533,171 A * | 8/1985 | Lake | 296/173 |
| 4,692,845 A | 9/1987 | Widhalm et al. | |
| 4,932,713 A | 6/1990 | Kubota | |
| 5,009,465 A | 4/1991 | Induni | |
| 5,058,942 A | 10/1991 | Minh | |
| 5,997,072 A | 12/1999 | Parkinson | |
| 6,299,243 B1 | 10/2001 | Gerald, Sr. | |
| 7,140,657 B2 | 11/2006 | Cuma | |
| 7,651,148 B2 | 1/2010 | Hustyi et al. | |
| 7,794,007 B2 | 9/2010 | Konet et al. | |
| 7,828,366 B2 | 11/2010 | Andre et al. | |
| 2009/0167053 A1 * | 7/2009 | Walker et al. | 296/146.11 |

* cited by examiner

*Primary Examiner* — Glenn Dayoan
*Assistant Examiner* — Melissa A Black
(74) *Attorney, Agent, or Firm* — Ralph E Smith

(57) ABSTRACT

A vehicle window assembly includes a cap that includes a rooftop section, which extends in a transverse direction of the vehicle, and a side wall that extends from the rooftop section generally in a normal direction. The side wall includes an opening. The window assembly also includes a rigid window that includes an interior surface and an exterior surface. Moreover, the window assembly includes a pivot coupling that pivotally connects the window to the cap for rotational movement between a closed position and an open position. The window covers the opening and the interior surface is operable to face the vehicle passenger compartment when the window is in the closed position. The window overlaps the rooftop section and the exterior surface faces the rooftop section when in the open position.

20 Claims, 5 Drawing Sheets

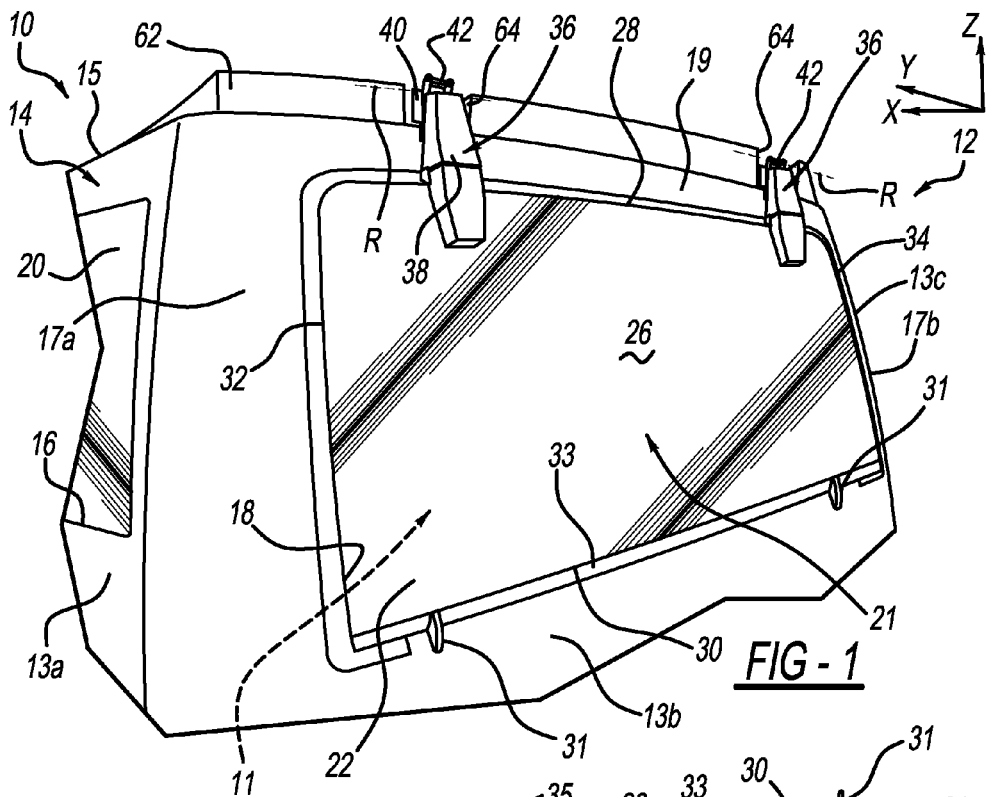
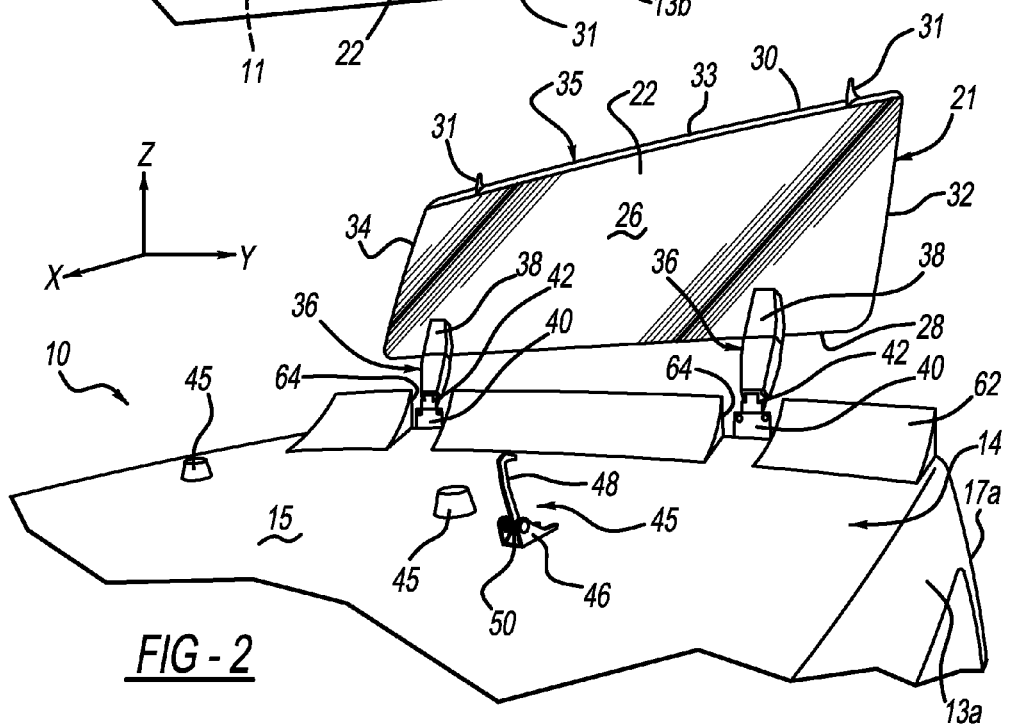

FLIP-OVER WINDOW ASSEMBLY FOR VEHICLE

FIELD

The present disclosure relates to a window assembly for a vehicle and, more particularly, relates to a flip-over window assembly for a vehicle.

BACKGROUND

Vehicles often include a windshield, one or more side windows, a rear window or backlite, and/or additional windows. These windows can be formed from glass, high-strength rigid polymer, flexible transparent plastic, or other transparent material. Some windows (e.g., the windshield) are typically fixed relative to the surrounding areas of the vehicle body. Other windows can be moveably supported by the vehicle body.

SUMMARY

A window assembly for a vehicle is disclosed. The vehicle defines a normal direction and a transverse direction that is transverse relative to the normal direction. The vehicle also includes a passenger compartment. The window assembly includes a cap that includes a rooftop section that extends in the transverse direction and a side wall that extends from the rooftop section generally in the normal direction. The side wall includes an opening. The window assembly also includes a rigid window that includes an interior surface and an exterior surface. Moreover, the window assembly includes a pivot coupling that pivotally connects the window to the cap for rotational movement between a closed position and an open position. The window covers the opening, and the interior surface of the window is operable to face the passenger compartment when the window is in the closed position. The window overlaps the rooftop section, and the exterior surface faces the rooftop section when in the open position.

Additionally, a vehicle is disclosed that defines a normal direction and a transverse direction that is transverse relative to the normal direction. The vehicle includes a body that at least partially defines a passenger compartment. The body includes a hardtop cap with a rooftop section that extends in generally in the transverse direction, a first pillar that extends generally in the normal direction from a first side of the rooftop section, a second pillar that extends generally in the normal direction from a second side of the rooftop section, and an eave that extends generally in the normal direction from the rooftop section and generally in the transverse direction between the first pillar and the second pillar. An opening is defined between the first pillar, the eave, and the second pillar. Furthermore, the vehicle includes a rigid window that includes an interior surface and an exterior surface. Additionally, the vehicle includes a pivot coupling that pivotally connects the window to the cap for rotational, flipping movement between a closed position and an open position. The window covers the opening and the interior surface faces the passenger compartment when the window is in the closed position. Also, the window overlaps the rooftop section and the exterior surface faces the rooftop section when in the open position.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 1 is a perspective view of a vehicle with a window assembly according to exemplary embodiments of the present disclosure, wherein a window of the window assembly is shown in a closed position;

FIG. 2 is a perspective view of the vehicle of FIG. 1, wherein the window is shown disposed in a partially open position;

DETAILED DESCRIPTION

Figure 3:
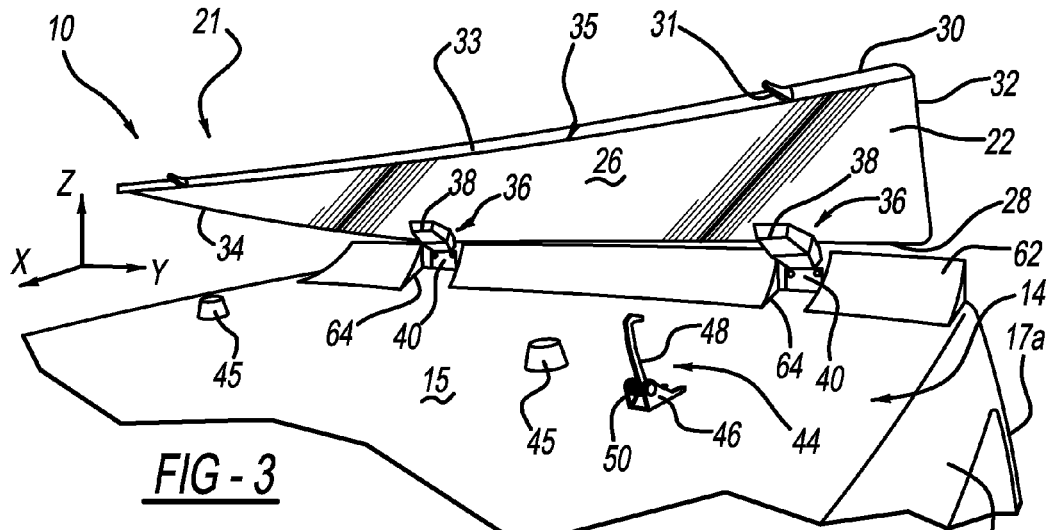
FIG. 3 is a perspective view of the vehicle of FIG. 1, wherein the window is shown disposed in a partially open position.
Figure 4:
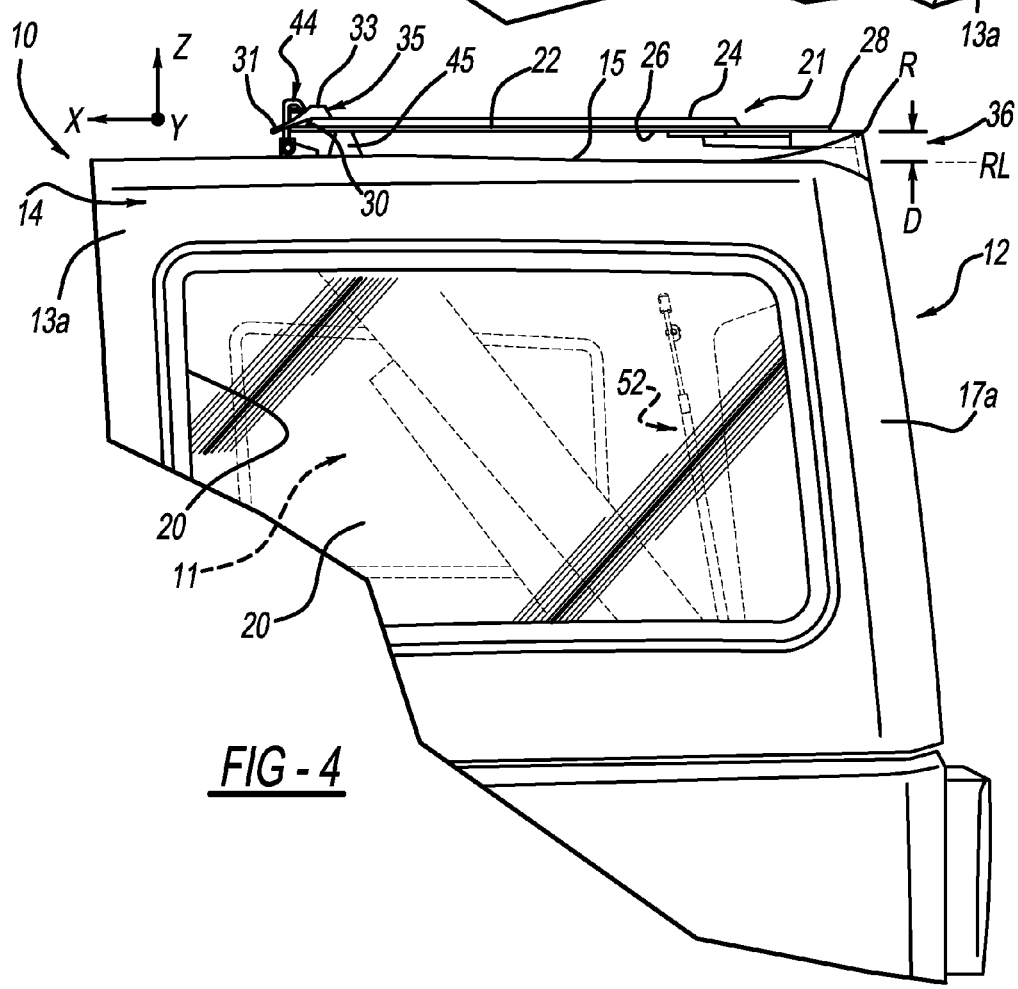
FIG. 4 is a side view of the vehicle of FIG. 1, wherein the window is shown in a fully open and latched position.
Figure 5:
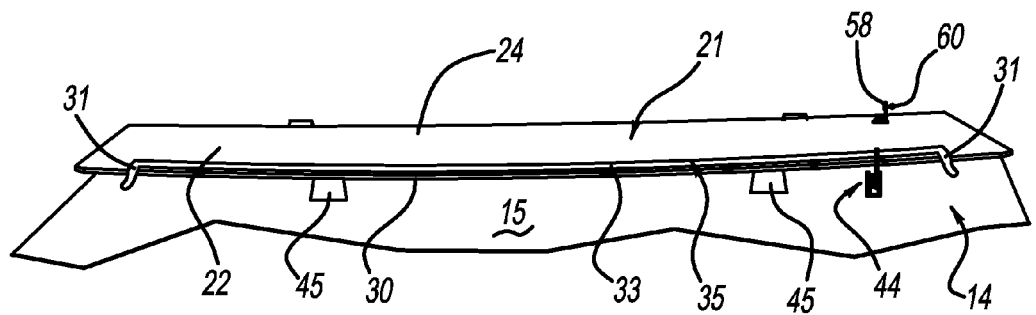
FIG. 5 is a front view of a cap and the window of the vehicle of FIG. 1, wherein the window is shown in the fully open and latched position.
Figure 6:
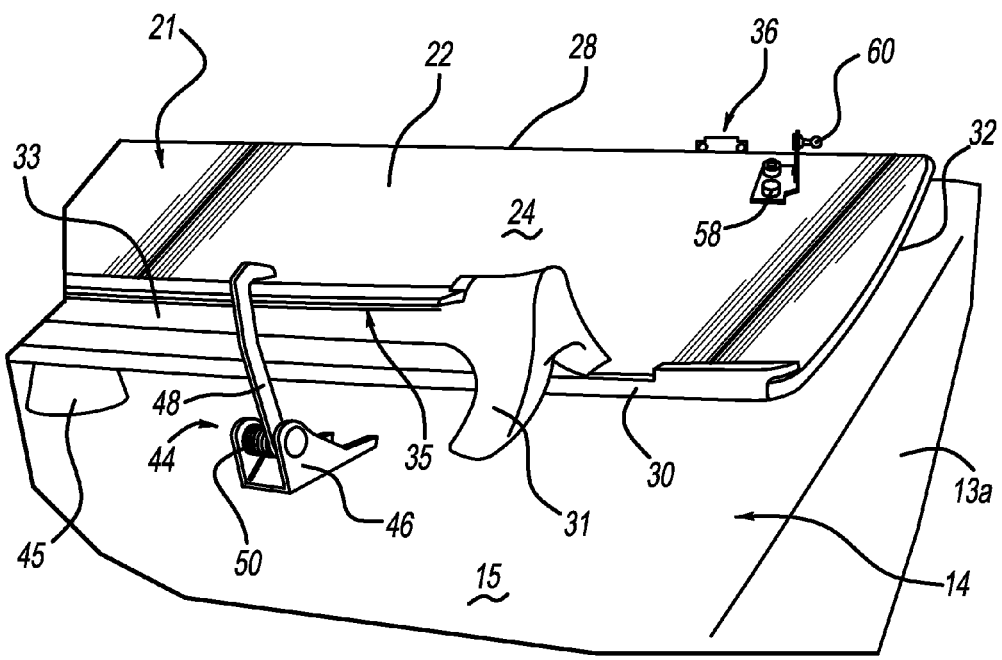
FIG. 6 is a perspective view of a latch of the vehicle shown latching the window assembly to the cap.

Referring initially to FIGS. 1-6, a vehicle 10 is illustrated that includes a window assembly 21 according to various exemplary embodiments of the present disclosure. As will be discussed the window assembly 21 can move (e.g., rotate and flip) between a closed position (FIG. 1) and an open position (FIGS. 4-6). When in the open position, a passenger compartment 11 of the vehicle 10 can be substantially open and airy, for instance, to increase air circulation through the passenger compartment 11. Also, when the window assembly 21 is in the open position, the vehicle 10 can readily accommodate cargo that partially extends out of the passenger compartment 11 (e.g., lumber, etc.). Also, the window assembly 21 can be readily stowed and secured in the open position as will be discussed in detail below.

Parts of the body of the vehicle 10 will now be discussed in detail. The vehicle 10 can be a car, truck, van, sports utility vehicle (SUV) or any other suitable vehicle. An upper rear end 12 of the vehicle 10 is shown in FIGS. 1-6; however, it will be appreciated that the vehicle 10 can also include a lower end with a vehicle frame and wheels, a vehicle front end with a windshield and dashboard and an engine, etc. The vehicle 10 can also define a normal (i.e., vertical) direction, which is substantially parallel to a yaw axis Z of the vehicle 10. The vehicle 10 can also define transverse (i.e., horizontal) directions that are perpendicular to the normal direction. Specifically, the vehicle 10 can define a cross-vehicle direction that is parallel to the pitch axis Y of the vehicle 10. Also, the vehicle 10 can define a forward-rearward direction that is parallel to the roll axis X of the vehicle 10.

The rear end 12 can be defined by a cap 14 that encloses a rear passenger compartment 11, rear cargo area, or other interior portion of the vehicle 10. The cap 14 can be a rigid body made out of assembled, formed sheets of metal (e.g., steel) so as to define a so-called "hardtop" for the vehicle 10. In other embodiments, the cap 14 is made from canvas or other flexible material. Also, the cap 14 can be selectively removable from the lower portions of the vehicle 10 in some embodiments. For instance, the cap 14 can be selectively and removably latched to the vehicle 10 via known latches, etc. Otherwise, the cap 14 can be more permanently attached or integral to the lower portions of the vehicle 10.

The cap 14 can be shaped with generally planar sides such that the rear end 12 of the vehicle 10 is box-shaped. More specifically, the cap 14 can include a rooftop section 15 that extends horizontally in both the cross-vehicle and forward-rearward directions of the vehicle 10. The rooftop section 15 can define a roofline RL as shown in FIG. 4. The roofline RL can be generally planar and can be defined by the majority of the exterior, horizontal surface of the rooftop section 15.

The cap 14 can also include a plurality of sidewalls 13a, 13b, 13c that extend downwardly in the normal direction from respective peripheral edges of the rooftop section 15. Specifically, the vehicle 10 can include a driver's side sidewall 13a, a rear wall 13b, a passenger's side sidewall 13c, and other sidewalls (not shown). In the embodiments illustrated, the rear wall 13b can be further defined by a driver's side pillar 17a (first pillar) that extends downward from one rear-side corner of the rooftop section 15, a passenger's side pillar 17b (second pillar) that extends downward from the opposite rear-side corner of the rooftop section 15, and an eave 19 that extends downward from the rooftop section 15 and transversely between the first and second pillars 17a, 17b.

Thus, a rear opening 18 can be defined between the pillars 17a, 17b, the eave 19, and the lower portion of the vehicle (not shown). The rear opening 18 can be generally rectangular or can have another shape. Side openings 16 can also be defined on the driver's and/or passenger's side of the vehicle 10 as well.

The vehicle 10 can further include one or more side windows 20 that cover the side openings 16 and a rear window 22 that covers the rear opening 18. The side and rear windows 20, 22 can be made from a rigid, transparent material, such as glass, polymeric material, etc. As will be discussed, the rear window 22 can be part of the window assembly 21; however, it will be appreciated that the side window 20 or other window could be part of the window assembly 21 of the present disclosure.

The rear window 22 can be flat, can include a slight convex curvature (when viewed from outside the vehicle 10), or can have another type of curvature. Also, the rear window 22 can be rectangular in some embodiments so as to cover and seal to the pillars 17a, 17b and the eave 19. Thus, the rear window 22 can include an interior surface 24, an exterior surface 26, a first horizontal edge 28, a second horizontal edge 30, a first vertical edge 32, and a second vertical edge 34. Although the rear window 22 extends substantially in the normal direction Z relative to the rooftop section 15 when in the closed position (FIG. 1), it will be appreciated that the rear window 22 (and the sidewall 13b of the cap 14) could extend downward at any angle from the rooftop section 15 (e.g., sloped downward from the rooftop section 15 in the rearward direction of the vehicle 10).

In some embodiments, the window 22 can also include a handle member 35. For instance, in the embodiments shown, the handle member 35 includes two projections 31 that project away from the second horizontal edge 30 of the rear window 22 and a middle portion 33 that extends transversely between the projections 31. The handle member 35 can be made from a rigid material and, in some embodiments, can be made from a different material from that of the rear window 22. As will be discussed, the handle member 35 can be grasped, for instance, for manually moving the window 22 between its closed position and its opened position.

The vehicle 10 can further include a pivot coupling (e.g., a hinge assembly or other pivot coupling), generally indicated at 36, that pivotally connects the rear window 22 to the cap 14. As shown in FIG. 2, the pivot coupling 36 can include a first rigid portion 38 (e.g., a rectangular, metal bracket, etc.) that is fixed to the exterior surface 26 of the rear window 22 adjacent the first horizontal edge 28 and that projects partially therefrom. The pivot coupling 36 can also include a second portion 40 (e.g., a rectangular, metal bracket, etc.) that is fixed to the eave 19 and that projects upward therefrom. Moreover, the pivot coupling 36 can include a pin 42 that pivotally attaches respective free ends of the first and second portions 38, 40. The pin 42 can define an axis of rotation R (FIGS. 1 and 4) about which the rear window 22 can rotate between its opened and closed positions. The axis of rotation R can be fixed relative to the roof section 15. Also, in the embodiments illustrated, the window 22 rotates only about the one axis of rotation R relative to the roof section 15; however the pivot coupling 36 could define multiple axes of rotation R about which the window 22 rotates.

As shown in FIGS. 1, 2, and 4, the axis of rotation R defined by the pivot coupling 36 is spaced above the roofline RL by a distance D in the normal direction. (An optional spoiler 62 is shown in the embodiments illustrated, but the spoiler 62 is not considered to be defining the roofline RL as will be discussed.) The distance D can be between 0.1 and 1.0 inches in some embodiments; however, the distance D could have any suitable value. Because the axis of rotation R is spaced above the roofline RL, the rear window 22 can invert, flip over, and overlap the rooftop section 15 when in the open position (see FIGS. 4 and 6) as will be discussed.

Thus, when the window 22 is in the closed position (FIG. 1), the window 22 can be disposed normally or vertically to cover the rear opening 18. Also, in this position, the interior surface 24 of the window 22 can face the passenger compartment 11, and the exterior surface 26 can face outward from the vehicle 10. In order to move the window 22 to the open position (FIGS. 4, 5, and 6), the user can grasp the handle member 35 and lift the window 22 away from the opening 18. The window 22 can then rotate about the axis of rotation R. (The window 22 is shown in various transitional positions (between the closed and open positions) in FIGS. 2 and 3 as it rotates about the axis R.) The window 22 can ultimately come to rest in its fully open position (FIGS. 4, 5, and 6) atop the rooftop section 15. In this position, the window 22 can be inverted and substantially parallel to the rooftop section 15 (FIG. 4) such that the exterior surface 26 faces the rooftop section 15 and the passenger compartment 11 therebelow.

Accordingly, with the window 22 in this fully open position, the passenger compartment 11 can be widely open to the air, thereby allowing breezes into the passenger compartment 11, etc. Thus, the passengers of the vehicle 10 can enjoy the open-air and spaciousness of the passenger compartment 11. Also, the window 22 can be opened and can come to rest atop the rooftop section 15 such that the window 22 is unlikely to obstruct cargo that sticks out of the rear opening 18 such that the vehicle 10 can be used for transporting large, elongate cargo. Moreover, with the window 22 flipped up and over the rooftop section 15, the weight of the window 22 can be largely supported by the rooftop section 15 for convenient and compact stowage of the window 22.

In some embodiments, the vehicle 10 can further include one or more bumpers 45 (FIGS. 2-6). The bumpers 45 can be made from resilient material, such as rubber or other polymeric material. The bumpers 45 can be disc-shaped and fixed to the rooftop section 15 and can extend normally upward therefrom. The window 22 can impact and/or come to rest atop the bumpers 45 when moving from the closed position to the open position. Thus, the bumpers 45 can limit the movement of the window 22. Also, the bumpers 45 can somewhat dampen the impact with the window 22 by resiliently flexing upon impact. It will be appreciated that the bumpers 45 could also be fixedly attached to the window 22 without departing from the scope of the present disclosure.

Moreover, the vehicle 10 can include a latch 44 that is operable to selectively retain the window 22 in the open position. In the embodiments shown in FIGS. 2, 3, 4, and 6, the latch 44 includes a bracket 46 that is fixed to the rooftop section 15 and a hook 48 that is moveably attached to the bracket 46. The latch 44 also includes a biasing member 50, such as a torsion spring, or other type of biasing member. The hook 48 can rotatably move relative to the bracket 46 and rooftop section 15 between an unlatched position (FIGS. 2 and 3) and a latched position (FIGS. 4 and 6), and the biasing member 50 can bias the hook 48 rearward toward the latched position.

Thus, when the window 22 is moving away from the closed position and toward the fully open position, the window 22 can contact the hook 48 and force (i.e., push) the hook 48 toward its unlatched position against the biasing force of the biasing member 50 to thereby allow passage of the window 22. Once the window 22 has passed the hook 48, the biasing member 50 can bias the hook 48 toward its latched position, and the hook 48 can come to rest hooked over the middle portion 33 of the handle member 35 or other portion of the window 22. To unlatch the window 22 and move the window 22 to its closed position, the hook 48 can be manually pivoted away from its latched position, thereby allowing the window 22 to move past the hook 48.

As such, the latch 44 can retain the window 22 in a fixed position relative to the cap 14. In some embodiments, the latching force supplied by the biasing member 50 and the weight of the window 22 on the cap 14 can be sufficient for retaining the window 22 in the open position when the vehicle 10 is moving. Also, the vehicle 10 can be configured such that the airstream about the window 22 is unlikely to unlatch and/or push the window 22 away from its open position when the vehicle 10 is moving.

Figure 7:
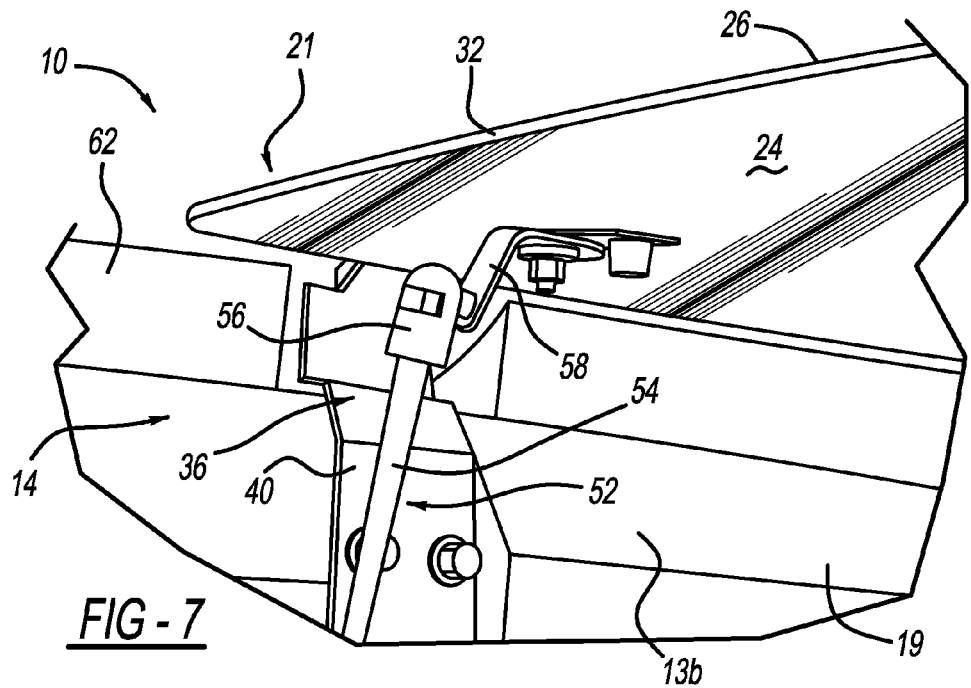
FIG. 7 is a perspective view of a propping member that is operable to prop the window in a partially open position.
Figure 8:
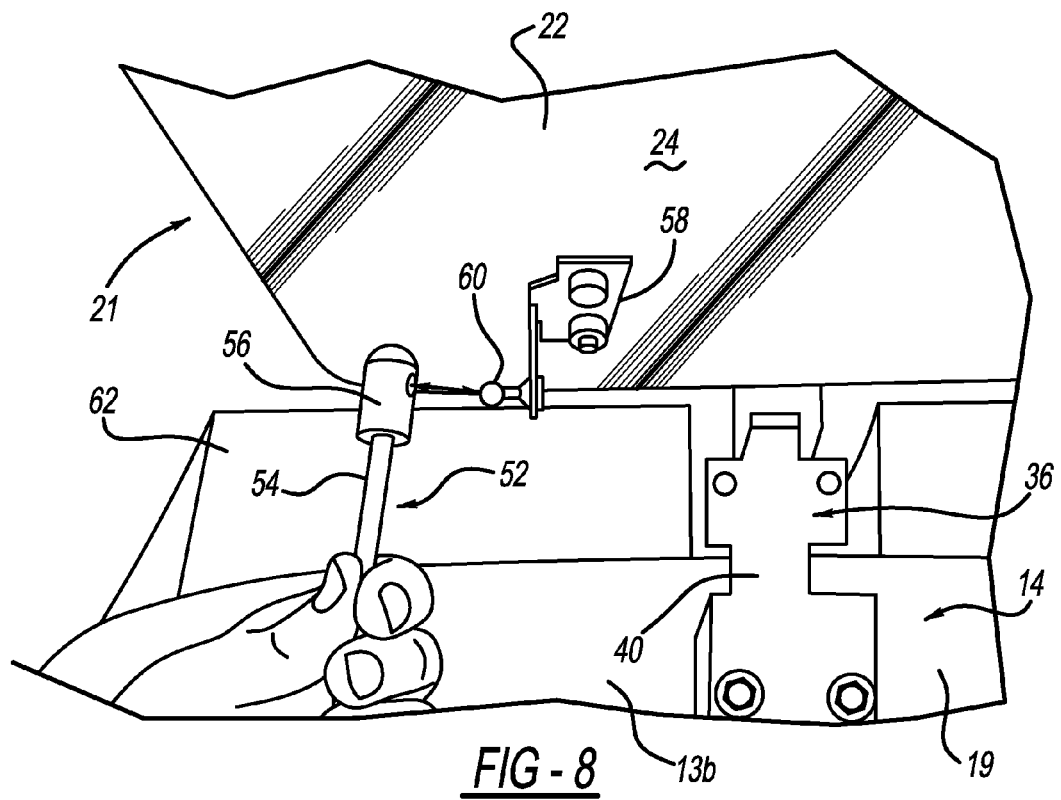
FIG. 8 is a perspective view of the propping member shown detached from the window.

Furthermore, the vehicle 10 can include one or more propping members 52 (FIGS. 7-10), which are operable to prop and support the rear window 22 in a fixed position (e.g., in a partially open position relative to the cap 14). The propping member 52 can include a telescoping rod 54, which is fixed at one end to the driver's side pillar 17a or other area of the rear end 12 of the vehicle 10. The opposite end of the propping member 52 can include a head 56 that is removably connected to a bracket 58, which is fixed to the interior surface 24 of the window 22 adjacent the intersection of the first vertical edge 32 and the first horizontal edge 28. The bracket 58 can project from the interior surface 24 and terminate at a ball 60 which is removably received in a corresponding opening in the head 56 (FIG. 8). More specifically, the head 56 can removably attach to the ball 60 via an interference fit by manually moving the head 56 toward the ball 60 and snapping the head 56 onto the ball 60. The head 56 can be removed from the ball 60 by manually pulling the head 56 away from the ball 60.

The telescoping rod 54 can include a spring or other biasing member such that when the head 56 is attached to the ball 60, the telescoping rod 54 can bias the window 22 away from the cap 14. Accordingly, the telescoping rod 54 can prop the window 22 in a propped position (e.g., in a substantially horizontal position as shown in FIG. 7). The propped position can be a position that is defined between the fully closed position (FIG. 1) and the fully open position (FIGS. 4-6) of the window 22. Also, the window 22 and/or cap 14 can include a latch (not shown) that can fix the window 22 to the cap 14 in the closed position (FIG. 1) against the biasing force supplied by the telescoping rod 54. Moreover, to move the window 22 to its flipped, fully open position (FIGS. 4-6), the head 56 can be pulled and detached from the ball 60, and the window 22 can be manually moved to the fully open position.

Figure 9:
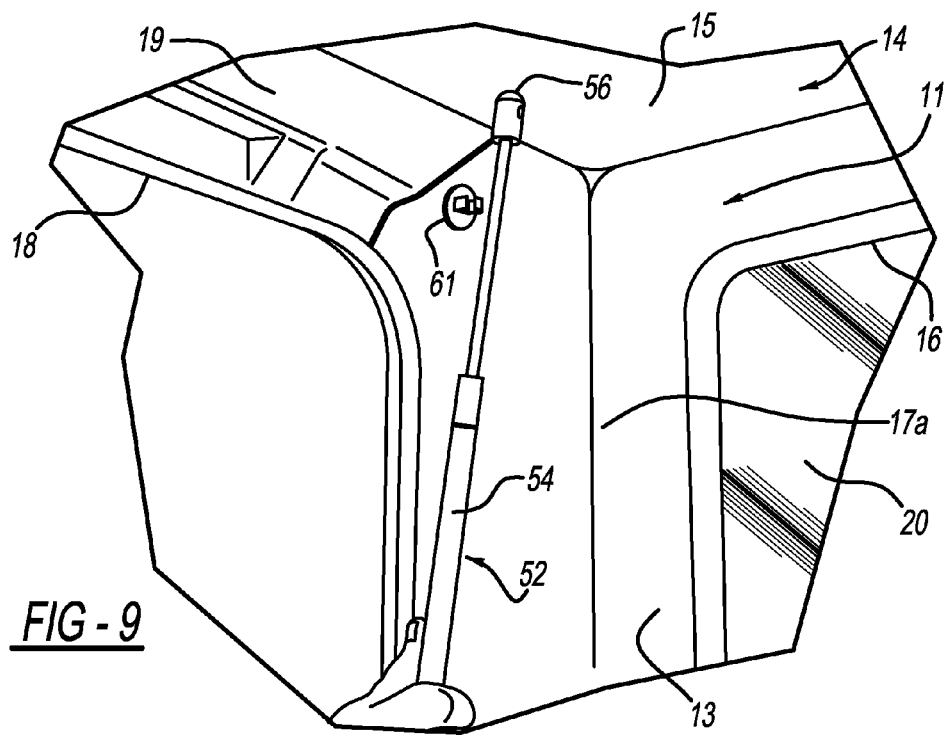
FIG. 9 is a perspective view of the propping member shown spaced apart from a prop retainer.
Figure 10:
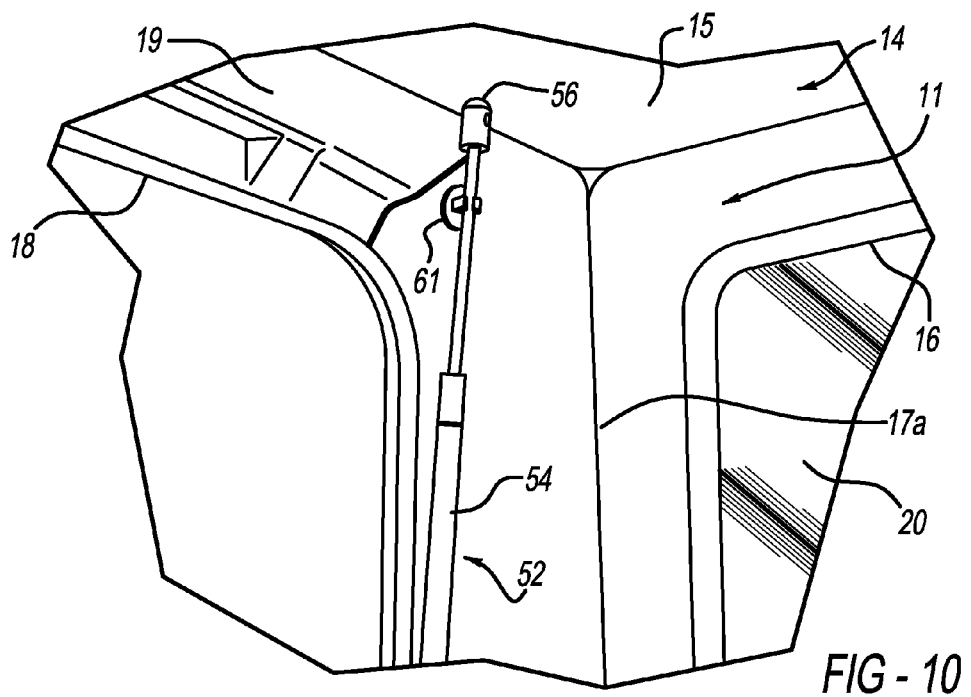
FIG. 10 is a perspective view of the propping member shown retained to the cap via the prop retainer of FIG. 9.

Also, as shown in FIGS. 9 and 10, the vehicle 10 can include a prop retainer 61 that is operable to retain the telescoping rod 54 to the cap 14 when disconnected from the bracket 58. The prop retainer 61 can include two or more resilient arms that resiliently flex to receive the telescoping rod 54 as shown in FIG. 10. The prop retainer 61 can also be manually pulled from the prop retainer 61 as shown in FIG. 9 to release the rod 54 and attach the head 56 to the bracket 58.

Additionally, the vehicle 10 can include a spoiler 62 (FIGS. 1 and 2) that is operable to direct airflow over the vehicle 10, adjacent the pivot couplings 36. The spoiler 62 can be elongate and can extend across the rooftop section 15 in the transverse (cross-vehicle) direction Y. Also, the spoiler 62 can include openings 64 or gaps that provide clearance for the respective pivot couplings 36. In additional embodiments, the spoiler 62 or the upstream face of the pivot couplings 36 can include ramped surfaces similar to the upstream surface of the spoiler 62 shown in the Figures. The upstream face of the spoiler 62 can curve gradually upward away from the roofline RL of the rooftop section 15 such that airflow over the spoiler 62 and over the pivot couplings 36 can be substantially laminar. Accordingly, the spoiler 62 can improve the fuel economy of the vehicle 10 by reducing wind resistance thereon. It will be appreciated that the pivot axis R of the pivot couplings 36 could be disposed radially below the apex of the spoiler 62 in some embodiments but still above the general roofline RL of rooftop section 15. Also, the first horizontal edge 28 of the window 22 can be disposed rearward of the spoiler 62 when the window 22 is disposed in the closed position, but the first horizontal edge 28 can rotate forward of the spoiler 62 when moving to the fully open position.

In summary, the window assembly 21 can be flipped up and over the rooftop section 15 and attached thereto. As such, the passenger compartment 11 can be a relatively wide, spacious, open, breezy, and pleasant environment with the window 22 fully open. Also, the passenger compartment 11 can better accommodate cargo that partially extends out of the rear opening 18. Accordingly, the window assembly 21 can improve the look, feel, and functionality of the vehicle 10.

What is claimed is:

1. A window assembly for a vehicle defining a normal direction and a transverse direction that is transverse relative to the normal direction, the vehicle including a passenger compartment, the window assembly comprising:
  a cap that includes a rooftop section that extends in the transverse direction and a side wall that extends from the rooftop section generally in the normal direction, the side wall including an opening;
  a rigid window that includes an interior surface and an exterior surface; and
  a pivot coupling that pivotally connects the window to the cap for rotational movement between a closed position and an open position, the window covering the opening and the interior surface operable to face the passenger compartment when the window is in the closed position, the window overlapping the rooftop section and the exterior surface facing the rooftop section when in the open position, wherein the rooftop section remains stationary relative to the side wall while the window moves between the first and second positions so that a size of the opening defined by the rooftop section and the side wall is the same in the open and closed positions, and wherein the window extends in the normal direction in the closed position and the window extends in the transverse direction in the open position.

2. The window assembly of claim 1, wherein the pivot coupling defines an axis of rotation, the window pivoting about the axis of rotation as the window moves between the closed position and the open position, the axis of rotation being fixed relative to the rooftop section.

3. The window assembly of claim 2, wherein the sidewall extends transversely below the rooftop section in the normal direction, and wherein the axis of rotation is disposed above the rooftop section in the normal direction to define a distance between the axis of rotation and the rooftop section in the normal direction.

4. The window assembly of claim 1, wherein the window rotates relative to the rooftop section about only one axis of rotation that is defined by the pivot coupling.

5. The window assembly of claim 1, further comprising a latch that is operable to retain the window in the open position.

6. The window assembly of claim 4, wherein the latch includes a hook and a biasing member, the hook being moveably coupled to the rooftop section to move between a latched position and an unlatched position, the latch operable to retain the window when in the latched position, the latch operable to release the window when in the unlatched position, the biasing member biasing the latch toward the latched position.

7. The window assembly of claim 6, wherein the window is operable to apply a load to the latch to force the latch toward the unlatched position as the window moves away from the closed position and toward the open position.

8. The window assembly of claim 1, wherein the rooftop section includes a spoiler that is operable to direct airflow adjacent the pivot coupling.

9. The window assembly of claim 1, further comprising a bumper that is fixed to one of the window and the rooftop section, the bumper operable limit movement of the window as the window moves from the closed position toward the open position, the bumper also operable to dampen impact of the window against the bumper.

10. The window assembly of claim 1, wherein the window defines a range of motion between the closed position and the open position, the window assembly further comprising a propping member that is operable to retain the window in a propped position, the propped position being defined within the range of motion between the closed position and the open position, the propping member being removably connected to the window.

11. The window assembly of claim 10, further comprising a prop retainer that is operably supported by the cap and that is operable to retain the propping member to the cap when removed from the window.

12. The window assembly of claim 1, further comprising a handle member configured for grasping and manually moving the window between the closed position and the open position.

13. The window assembly of claim 1, wherein the window is substantially parallel to the rooftop section when in the open position.

14. The window assembly of claim 1, wherein the cap is a rigid body.

15. The window assembly of claim 1, wherein the side wall includes a first pillar, a second pillar, and an eave that extends in the transverse direction between the first pillar and the second pillar, the opening defined between the first pillar, the eave, and the second pillar.

16. A vehicle that defines a normal direction and a transverse direction that is transverse relative to the normal direction, comprising:

a body that at least partially defines a passenger compartment, the body including a hardtop cap with a rooftop section that extends in generally in the transverse direction, a first pillar that extends generally in the normal direction from a first side of the rooftop section, a second pillar that extends generally in the normal direction from a second side of the rooftop section, and an eave that extends generally in the normal direction from the rooftop section and generally in the transverse direction between the first pillar and the second pillar, an opening being defined between the first pillar, the eave, and the second pillar;

a rigid window that includes an interior surface and an exterior surface; and a pivot coupling that pivotally connects the window to the cap for rotational, flipping movement between a closed position and an open position, the window covering the opening and the interior surface facing the passenger compartment when the window is in the closed position, the window overlapping the rooftop section and the exterior surface facing the rooftop section when in the open position, wherein the rooftop section remains stationary relative to the first and second pillars while the window moves between the first and second positions so that a size of the opening is the same in the open and closed positions, and wherein the window extends in the normal direction in the closed position and the window extends in the transverse direction in the open position.

17. The vehicle of claim 16, further comprising a latch that is operable to retain the window in the open position, wherein the latch includes a hook and a biasing member, the hook being moveably coupled to the rooftop section to move between a latched position and an unlatched position, the latch operable to retain the window when in the latched position, the latch operable to release the window when in the unlatched position, the biasing member biasing the latch toward the latched position.

18. The vehicle of claim 16, wherein the rooftop section includes a spoiler that is operable to direct airflow adjacent the pivot coupling.

19. The vehicle of claim 16, wherein the window defines a range of motion between the closed position and the open position, the vehicle further comprising a propping member that is operable to retain the window in a propped position, the propped position being defined within the range of motion between the closed position and the open position, the propping member being removably connected to the window, and further comprising a prop retainer that is operable to retain the propping member when removed from the window.

20. The vehicle of claim 16, further comprising a bumper that is fixed to one of the window and the rooftop section, the bumper operable limit movement of the window as the window moves from the closed position toward the open position, the bumper also operable to dampen impact of the window against the bumper.

* * * * *